United States Patent
Ufer et al.

(10) Patent No.: US 9,757,904 B2
(45) Date of Patent: Sep. 12, 2017

(54) METHOD FOR TRANSVERSELY DEPOSITING FIBERS

(71) Applicants: Voith Patent GmbH, Heidenheim (DE); Audi AG, Ingolstadt (DE)

(72) Inventors: Jaromir Ufer, München (DE); Marco Göttinger, München (DE)

(73) Assignee: Voith Patent GmbH, Heidenheim (DE)

( * ) Notice: Subject to any disclaimer, the term of this patent is extended or adjusted under 35 U.S.C. 154(b) by 209 days.

(21) Appl. No.: 14/478,142

(22) Filed: Sep. 5, 2014

(65) Prior Publication Data
US 2014/0367031 A1 Dec. 18, 2014

Related U.S. Application Data

(63) Continuation of application No. PCT/EP2013/054375, filed on Mar. 5, 2013.

(30) Foreign Application Priority Data

Mar. 5, 2012 (DE) .................. 10 2012 203 388

(51) Int. Cl.
| | |
|---|---|
| *B29B 11/16* | (2006.01) |
| *B29C 65/78* | (2006.01) |
| *B29C 70/06* | (2006.01) |
| *B29C 70/20* | (2006.01) |
| *B29C 70/38* | (2006.01) |
| *B32B 5/26* | (2006.01) |

(Continued)

(52) U.S. Cl.
CPC .............. *B29C 70/06* (2013.01); *B29B 11/16* (2013.01); *B29C 65/008* (2013.01); *B29C 65/14* (2013.01);
(Continued)

(58) Field of Classification Search
CPC ... B29B 11/16; B29C 65/008; B29C 65/4835; B29C 65/7847; B29C 65/7852;
(Continued)

(56) References Cited

U.S. PATENT DOCUMENTS

| 3,761,345 A | 9/1973 | Smith |
|---|---|---|
| 4,938,824 A | 7/1990 | Youngkeit |

(Continued)

FOREIGN PATENT DOCUMENTS

| DE | 2060261 A1 * | 6/1971 |
|---|---|---|
| DE | 39 10 245 A1 | 2/1990 |

(Continued)

OTHER PUBLICATIONS

Notification Concerning Transmittal of International Preliminary Report on Patentability and Written Decision of the International Searching Authority dated Jun. 5, 2013 for International Application No. PCT/EP2013/054375 (11 pages).

(Continued)

*Primary Examiner* — Michael Tolin
(74) *Attorney, Agent, or Firm* — Taylor IP, P.C.

(57) ABSTRACT

The invention relates to a method for depositing one- or two-dimensional fiber structures in order to form a two- or three-dimensional fiber structure, in particular a fiber structure in the form of a fiber-reinforced plastic (FRP) or FRP semi-finished product, using a production machine including at least one depositing device and at least one fiber support. The one- or two-dimensional fiber structures have at least one unidirectional fiber layer. The depositing device deposits the one- or two-dimensional fiber structures onto the fiber support in a depositing direction in a controlled manner such that the fiber directions of the deposited one- or two-dimensional fiber structures assume an angle $\alpha > 20°$, preferably $\alpha > 60°$, and a maximum of $\alpha = 90°$, relative to the depositing direction. The one- or two-dimensional fiber structures are deposited on the fiber support in a substantially tension-free manner with respect to the fiber direction of the fiber structures.

11 Claims, 4 Drawing Sheets

(51) Int. Cl.
B29C 70/22 (2006.01)
B29C 65/00 (2006.01)
B29C 65/14 (2006.01)
B29C 67/00 (2017.01)

(52) U.S. Cl.
CPC ...... B29C 65/7847 (2013.01); B29C 67/0074 (2013.01); B29C 70/20 (2013.01); B29C 70/202 (2013.01); B29C 70/228 (2013.01); B29C 70/382 (2013.01); B29C 70/384 (2013.01); B29C 70/386 (2013.01); B29C 70/388 (2013.01); B32B 5/26 (2013.01); *Y10T 156/17* (2015.01)

(58) Field of Classification Search
CPC ....... B29C 70/06; B29C 70/20; B29C 70/202; B29C 70/228; B29C 70/38; B29C 70/382; B29C 70/384; B29C 70/386; B29C 70/388; B29C 70/541; B32B 5/26
See application file for complete search history.

(56) References Cited

U.S. PATENT DOCUMENTS

| | | | |
|---|---|---|---|
| 5,017,312 A | 5/1991 | Peters et al. | |
| 5,445,693 A | 8/1995 | Vane | |
| 5,809,805 A | 9/1998 | Palmer et al. | |
| 5,945,356 A * | 8/1999 | Pott | D04H 3/04 428/116 |
| 5,965,262 A | 10/1999 | Whisler et al. | |
| 7,832,446 B2 | 11/2010 | Van Den Aker | |
| 8,088,470 B2 | 1/2012 | Dolby | |
| 8,621,722 B2 | 1/2014 | Reußmann et al. | |
| 9,206,536 B2 | 12/2015 | Kuhn et al. | |
| 2006/0118244 A1 | 6/2006 | Zaballos et al. | |
| 2008/0047657 A1* | 2/2008 | Jander | B29C 70/14 156/166 |
| 2011/0203737 A1 | 8/2011 | Slyne | |

FOREIGN PATENT DOCUMENTS

| | | |
|---|---|---|
| DE | 195 37 663 A1 | 4/1997 |
| DE | 100 21 341 A1 | 11/2001 |
| DE | 103 01 646 A1 | 7/2004 |
| DE | 10 2008 058 270 A1 | 6/2010 |
| EP | 0 606 830 A1 | 1/1993 |
| FR | 2 256 017 A1 | 7/1975 |

OTHER PUBLICATIONS

German Office Action dated Oct. 17, 2012 for German Application No. 10 2012 203 388.2 (10 pages).

\* cited by examiner

METHOD FOR TRANSVERSELY DEPOSITING FIBERS

CROSS REFERENCE TO RELATED APPLICATIONS

This is a continuation of PCT application No. PCT/EP2013/054375, entitled "METHOD FOR TRANSVERSELY DEPOSITING FIBERS", filed Mar. 5, 2013, which is incorporated herein by reference.

BACKGROUND OF THE INVENTION

1. Field of the Invention

The invention relates to a method for depositing 1 or 2-dimensional fiber structures in order to form a 2 or 3-dimensional fiber structure, in particular a fiber structure in the form of a fiber-reinforced plastic (FRP) or FRP semi-finished product using a production machine comprising at least one depositing device and at least one fiber support, wherein the depositing device places the 1 or 2-dimensional fiber structures onto the fiber support. The invention further relates to a production machine to produce a 2 or 3-dimensional fiber structure, in particular in the form of a fiber-reinforced plastic or fiber reinforced semi-finished product in accordance with the aforementioned method.

2. Description of the Related Art

In manufacturing a fiber-reinforced plastic, methods are used such as for example, automated fiber placement (AFP) or automated tape laying (ATL). In these methods the 1 or 2-dimensional fiber structures are deposited onto a surface in the form of unidirectional tapes. The direction of placement of the 1 or 2-dimensional fiber structures in methods of this type is consistent with the fiber direction of the 1 or 2-dimensional fiber structures. Pre-tensioning could be required under certain circumstances in order to be able to place the fibers in a stretched condition. However, the previously described method of depositing can encounter limits with three-dimensional geometries of the fiber support tape which the 1 or 2-dimensional fiber structures are deposited since—depending on the fiber ribbon width or respectively tape width and the diameter of the pressure roller—depositing the 1 or 2-dimensional fiber structures onto curved surfaces is possible only to a limited extent.

The objective of the present invention is to provide an improved method for depositing of 1 or 2-dimensional fiber structures and to provide an improved or at least an alternative design form for a production machine utilized in this method which is characterized in particular by a wider field of application, for example also on curved surfaces.

SUMMARY OF THE INVENTION

One aspect of the invention therefore suggests a method for depositing 1 or 2-dimensional fiber structures in order to form a 2 or 3-dimensional fiber structure, in particular in the form of a fiber-reinforced plastic or FRP semi-finished product, utilizing a production machine which comprises at least one depositing device and at least one fiber support, whereby the 1 or 2-dimensional fiber structures comprise at least one unidirectional fiber layer. Hereby at least one depositing device places 1 or 2-dimensional fiber structures onto a fiber support in direction of placement in such a way that the fiber direction of the deposited 1 or 2-dimensional fiber structures assumes an angle $\alpha>20°$ relative to the direction of placement. The fiber directions of the deposited 1 or 2-dimensional fiber structures can also assume an angle $\alpha>40°$, in particular $\alpha>60°$ and for example $\alpha>70°$ relative to the direction of placement. Angle $\alpha$ can hereby assume a maximum value of 90°. In other words, in regard to angle $\alpha$ an acute angle or the right angle is always considered, whereby the 1 or 2-dimensional fiber structures are deposited free of tension in the fiber direction onto the fiber support.

Due to the fact that the 1 or 2-dimensional fiber structures are not unwound from the roller in the form of endless fiber structures and deposited under tension as is the case in the current state of the art with multi-axial laid structures, but instead are deposited as tension free segments in the fiber direction, curved surfaces can also be very well covered.

Moreover, the 1 or 2-dimensional fiber structures can in addition be deposited tension free in the direction of placement on the fiber support.

Tension-free depositing in fiber direction and/or direction of placement is understood to be depositing of 1 or 2-dimensional fiber structures in such a way that the 1 or 2-dimensional fiber structures are not under tension in the fiber direction and/or direction of placement while being deposited. Consequently, the 1 or 2-dimensional fiber structures are not pre-tensioned during depositing, but are for example deposited onto the fiber support without being pulled at the ends. Due to the absence of pre-tensioning a stretched depositing of the 1 or 2-dimensional fiber structures can now be achieved without the 1 or 2-dimensional fiber structures being tensioned along their fiber direction and/or in direction of placement. Also, slippage of the deposited layers on top of one another and a herewith associated undesired displacement of 1 or 2-dimensional fiber structures in adjacent or lower layers can advantageously be avoided or reduced during depositing. Moreover, higher rates of deposit can be achieved compared to a pre-tensioned placement of 1 or 2-dimensional fiber structures since no tensile forces act which—with a necessary fixing of the 1 or 2-dimensional fiber structures—can lead to displacements, breaks or unintended detachment of prefixed layers or between the 1 or 2-dimensional fiber structures.

Moreover, with tension-free depositing of the 1 or 2-dimensional fiber structures a reduction of the tensile stress to zero can be accomplished which is not possible with conventional methods that work with tensile stress, since at least a minimum tensile stress must act upon the 1 or 2-dimensional fiber structures.

In conventional depositing of 1 or 2-dimensional fiber structures the fixing point underneath the press device and the material guidance of the depositing device assumes a minimum fiber length, normally 6 to 30 cm. In particular with small components local reinforcements within the component cannot be realized due to this minimum fiber length. Furthermore increased scrap may necessarily occur outside the component due to the minimum fiber length. 1 or 2-dimensional fiber structures having a significantly reduced minimum fiber length or respectively fiber structure length can advantageously be used through this type of transverse depositing of 1 or 2-dimensional fiber structures, whereby the fiber directions of the 1 or 2-dimensional fiber structures assume an angle $\alpha>20°$ relative to the direction of placement. Due to the smaller fiber lengths or respectively fiber structure lengths, greater flexibility can be achieved when introducing local reinforcements, as well as a reduction in scrap. For example, this is demanded more and more in smaller automotive structures compared to the large structures in the aerospace industry, in particular in order to reduce the production costs.

Moreover in conventional depositing of the 1 or 2-dimensional fiber structures in the fiber direction usually no defined material guidance at the fiber end, in other words between the compression device and the draping device, is provided due to the stiffness of the fibers in the longitudinal direction. As a result, there may be no specific heat energy input possible in this position, which is necessary for fixation. This disadvantage which occurs in conventional depositing of 1 or 2-dimensional fiber structures can be overcome by transversely depositing the 1 or 2-dimensional fiber structures so that advantageously a necessary targeted thermal energy input is also possible at the fiber end, and a consolidation or fixing of the 1 or 2-dimensional fiber structures can also be ensured and reproduced at the fiber ends.

A 1-dimensional fiber structure is understood to be a fiber structure wherein the extension of the fiber structure in a width and height direction relative to the extension of the fiber structure in the longitudinal direction is negligible. In other words, the extension of the fiber structure in the longitudinal direction is predominant and formative. Both directions—width or height—can thereby have a substantially identical extension, or one of the two directions may be significantly greater in its extension relative to the other. The term "1-dimensional fiber structure" includes fibers, continuous fibers, yarns, fiber bundles, fiber strands, filaments, filament bundles, rovings or hybrid forms. Preferably also expanded fibers or rovings can be deposited. The expansion may occur in advance in the raw material or during the process prior to or during the deposit.

A 2-dimensional fiber structure is understood to be a fiber structure wherein the extension of the fiber structure in a height direction relative to the extension of the fiber structure in a longitudinal and width direction is negligible. In other words, the extension of the fiber structure in a longitudinal and width direction is predominant and formative. Both directions—width or length—can thereby have a substantially identical extension, or one of the two directions may be significantly greater in its extension relative to the other. The term "2-dimensional fiber structure" includes woven fabrics, knitted fabrics, nonwovens, unidirectional deposited fiber layers, multi-axial laid structures, mats, knitwear, mesh fabrics, braided sleeves, embroidery, sewing kits, peel fabrics or hybrid forms.

All 2-dimensional fiber structures which are used as 1 or 2-dimensional fiber structures in production have however in common at least one unidirectional fiber layer. For example, in order to form a usable two-dimensional fiber structure, a unidirectional fiber layer can be applied onto a nonwoven material. A multi-axial laid structure for example possesses several unidirectional fiber layers whereby the fiber orientations in the individual fiber layers are turned relative to each other. The 1 or 2-dimensional fiber structures that are being deposited however are structured such that all fibers exhibit a fiber orientation that is within the above referenced angle range relative to the placement direction. The 1 or 2-dimensional fiber structure consists preferably of one or several unidirectional layers. All fibers that are deposited in a 1 or 2-dimensional fiber structure exhibit especially preferably the same fiber orientation.

A 3-dimensional fiber structure is understood to be a fiber structure whose extension in length, width and height direction is not predominant relative to any of the directions. All directions can thereby have a substantially identical extension, or one or two of the three directions may be significantly greater in its, or in their extension relative to the other or others. The term "3-dimensional fiber structure" is to be understood to be essentially several 2-dimensional fiber structures layered on top of one another. The 2-dimensional fiber structures may hereby be arranged differently. It is conceivable that for example a unidirectional fiber layer is followed by a nonwoven fabric as the next layer, whereas a woven fabric may complete the 3-dimensional fiber structure. However, only unidirectional 2-dimensional fiber structures may be also be used exclusively for the composition of a 3-dimensional fiber structure. The unidirectional 2-dimensional fiber structures may hereby be oriented the same or differently in regard to their direction. The latter case is a multi-axial laid structure.

A fiber reinforced plastic consists substantially of at least one of a 1, 2 or 3-dimensional fiber structure which is embedded into a plastic matrix. The at least one 1, 2 or 3-dimensional fiber structure is hereby surrounded by the plastic matrix which is attached to the at least one 1, 2 or 3-dimensional fiber structure through adhesive or cohesive forces. Materials used for fiber structures may be glass fibers, carbon fibers, aramid fibers, PBO-fibers, polyethylene fibers, natural fibers, basalt fibers, quartz fibers, aluminum-oxide fibers, silicon fibers or hybrid forms. Materials used for the matrix may be thermosetting plastics (in particular saturated or unsaturated polyester resins, epoxy resins), thermoplastics, elastomers or hybrid forms, possibly also with fillers.

A FRP semi-finished product is a 2 or 3-dimensional fiber structure that acts as a preform, blank, prepreg or hybrid form for a fiber reinforced plastic. The fiber-reinforced plastic can be produced from the FRP semi-finished product through application of the matrix or respectively the matrix material in or on the FRP semi-finished product and for example through subsequent compaction. The FRP semi-finished product may include plastics that act as binders, bonding agents, impregnation agents, adhesion promoters or hybrid forms. For example, by means of these plastics, the FRP semi-finished product can maintain its shape so that a movement of the fiber structures relative to each other, for example during transportation, can be largely prevented. It is also conceivable that the FRP semi-finished product is in the embodiment of a fiber-matrix semi-finished product. In this case the 2 or 3-dimensional fiber structure is impregnated with matrix material, whereby the matrix material is at least partially polymerized. The matrix material therein fulfills a fixing function in the fiber-matrix semi-finished product, so that movement of the fiber structure or respectively the fiber layers relative to each other are possibly at least reduced during further processing.

A "Depositing" device is understood to be a device which deposits the 1 or 2-dimensional fiber structures onto a fiber support, whereby the fiber support can be in the embodiment of for example a tool bench, conveyor, continuous screen, continuous felt, one half of a compression mold, a roller—suction equipped or electrostatically chargeable, or the like. The fiber support may hereby be any desired machine component onto which the 1 or 2-dimensional fiber structures are deposited by means of the depositing device. The depositing device may hereby be in the embodiment of for example a conveyor belt, continuous screen, a roller—suction equipped or electrostatically chargeable, or the like.

The "placement direction" is understood to be the direction relative to the fiber support in which the depositing device deposits the 1 or 2-dimensional fiber structure onto the fiber support. The depositing device can hereby move along the fiber support, for example in the case of an in particular funnel-shaped wide slot die by means of which the 1 or 2-dimensional fiber structures are deposited onto the fiber support. It is however also conceivable that the fiber support, for example in the embodiment of a conveyor belt moves while the depositing device remains stationary. Or it is conceivable that the depositing device, as well as the fiber support is movable as in the case of for example two conveyors, whereby the one conveyor deposits the 1 or 2-dimensional fiber structures onto the other conveyor.

"Fiber direction" is understood to be the fiber orientation of the individual fibers or filaments in the 1 or 2-dimensional fiber structures. The fiber direction in 1-dimensional fiber structures can hereby be consistent with the longitudinal direction of the 1-dimensional fiber structure if the fibers are arranged in longitudinal direction in the 1-dimensional fiber structure. In the case of stretched fibers the fiber orientation is hereby consistent substantially with the longitudinal direction of the fibers or respectively the filaments.

"Unidirectional fiber layer" is understood to be a 2-dimensional fiber structure wherein all fibers are oriented parallel to each other. In a unidirectional fiber layer all fibers therefore have the same fiber orientation or respectively fiber direction.

The fiber direction of the deposited 1 or 2-dimensional fiber structures in the 2 or 3-dimensional fiber structure is arranged at an angle $\alpha>0°$ relative to the placement direction. This angle $\alpha$ can have the same value for all 1 or 2-dimensional fiber structures. If for example the placement direction of the depositing device is varied during depositing, then the fiber directions of the deposited 1 or 2-dimensional fiber structures can be oriented at different angles $\alpha$ relative to the placement direction. Also, a predetermined number of 1 or 2-dimensional fiber structures can hereby be positioned with their fiber direction positioned parallel to the placement direction and thereby at an angle $\alpha=0°$. However, also in this case the fiber directions of at least a portion of the 1 or 2-dimensional fiber structures are positioned at an angle of $\alpha>0°$.

The quality of the fiber-reinforced plastics or respectively the FRP-semi-finished products can be advantageously improved through such transverse depositing and among other factors due to the defined fixing of fiber ends. Moreover a higher rate of depositing can be achieved due to this and a desired characteristics profile of the preform can be produced with greater flexibility.

"Characteristic profile" is understood to be the material behavior of the completed fiber-reinforced plastic, for example a stiffness profile or a rigidity profile.

The 1 or 2-dimensional fiber structures can furthermore comprise several unidirectional fiber layers. In using 1 or 2-dimensional fiber structures with a plurality of unidirectional fiber layers a greater volume of deposited fiber material can advantageously be achieved.

The 1 or 2-dimensional fiber structures can moreover consist of several unidirectional fiber layers. If only unidirectional fiber layers are used targeted characteristics profiles can be produced which are not disturbed by random orientation or undesired orientation of the fibers.

The 1 or 2-dimensional fiber structures may moreover be arranged as multi-axial laid structures. With multi-axial laid structures, targeted characteristics profiles can be produced which are not disturbed by random orientation or undesired orientation of the fibers.

The 1 or 2-dimensional fiber structures can moreover consist of one unidirectional fiber layer. The characteristics profile can be guided into the desired direction depending on the application of a unidirectional fiber layer. As a result, a flexible individual adaptation of the characteristics profile is possible during production.

The 1 or 2-dimensional fiber structures can moreover be combined into one strand whereby the individual 1 or 2-dimensional fiber structures form strand sections and whereby the fiber direction of the 1 or 2-dimensional fiber structures are arranged at an angle of $>40°$ to the longitudinal direction of the strand.

The individual 1 or 2-dimensional fiber structures from which the 2 or 3-dimensional fiber structure is formed can also be connected with each other in the form of a strand, for example by means of the binding agents or matrix material which is applied regionally. The individual sections of the strand are composed of the 1 or 2-dimensional fiber structures, wherein the fiber directions in the strand sections or respectively the 1 or 2-dimensional fiber structures are arranged at an angle $>40°$ to the longitudinal direction of the strand. A sharp angle or the right angle is thereby measured as an angle. The strand can thereby for example be deposited advantageously non-tensioned onto the fiber support. Possible wave formation of the strand in the placement direction, do not hereby lead to crimping or bending of the fibers or filaments during subsequent compaction since—due to their uniform fiber orientation—the fibers are deposited simply one above the other.

The 1 or 2-dimensional fiber structures can be pre-treated before and/or during and/or after depositing with a binding agent or matrix material in such a way that they adhere to each other and/or onto the fiber support.

Through the use of a binding agent, movement of the 1 or 2-dimensional fiber structures or even the different layers relative to each other can advantageously be reduced or prevented, so that during the depositing process a positional precise placement without subsequent slippage is possible. Consequently the individual fiber layers are reproducible in the desired positioning and with the desired characteristics profile. Duroplastic or thermoplastics can thereby be used as binding agents. Matrix material can also be used directly as binding agent.

The fiber support may moreover comprise a first half of a compression mold with a surface profile which structures the fiber reinforced plastic which is to be produced with the method, or the FRP semi-finished product which is to be produced with the method during a consolidation process.

Depositing of the 1 or 2-dimensional fiber structures as well as their consolidation or respectively partial consolidation into a fiber reinforced plastic or FRP semi-finished product can be accomplished by a first half of a compression mold which in addition simplifies the production process and increases the production speed.

"Consolidation process" is understood to be a process in which the fiber layers are fixed to each other at least partially and the final contour or final profile is shaped at least close to the final contour or final profile. The compression mold half can hereby also be multi-part. Consequently it is advantageous to achieve higher flexibility and variation of the surface profiles for example through exchanging individual components of the compression mold half.

Furthermore, a holding device can be provided which may include several holding elements. Through the provision of such a holding device comprising several holding elements, slipping of the 1 or 2-dimensional fiber structures on for example curved surfaces or surface profiles can be largely reduced, so that even with such curved surface profiles the formation of an exact and reproducible characteristics profile of the fiber reinforced plastic becomes possible. The holding elements can hereby position the 1 or 2-dimensional fiber structures which are deposited on the fiber support so that even on curved surfaces and surface profiles a somewhat exact placement of the 1 or 2-dimensional fiber structures is possible without subsequent slippage. The holding elements can hereby be designed such that they can be recessed in the fiber support. The holding elements may be designed porcupine-like, therefore comprising a plurality of spikes, spines or the like or it is conceivable that the holding elements in the embodiment of spikes, spines or other restrictive elements can be lowered onto the surface profile of the fiber support, so that sliding off or slipping out of place of the 1 or 2-dimensional fiber structures during depositing is prevented. Because of such a holding device binding agents or part of the required binding agents can possibly be foregone.

Moreover, at least one device may be provided which produces an adhesion force upon the 1 or 2-dimensional fiber structures by means of which the 1 or 2-dimensional fiber structures can be held specifically on the respective component of the production machine.

By means of such adhesion force, uncontrolled detaching of the 1 or 2-dimensional fiber structures from the respective component in the production machine can be avoided.

The fiber support may moreover include a suction device by means of which a suction force is generated in the fiber support which holds the 1 or 2-dimensional fiber structures on the fiber support.

Consequently, once deposited, the fiber structures can advantageously be held precisely on the fiber support by means of suction thus avoiding slipping of the 1 or 2-dimensional fiber structures relative to each other after depositing. Such a suction device may be a vacuum pump or suchlike with which a vacuum is produced in the fiber support and with which the deposited 1 or 2-dimensional fiber structures can be held on the fiber support, for example over a perforated plate or a slotted plate or suchlike.

The fiber support may moreover include an electric polarization device by means of which an electrostatic adhesion force is generated which holds the deposited 1 or 2-dimensional fiber structures on the fiber support.

If the 1 or 2-dimensional fiber structures are thereby placed opposite to the fiber support then the 1 or 2-dimensional fiber structures adhere to the fiber support due to the electrostatic adhesion force. Slipping of the 1 or 2-dimensional fiber structures after they have been deposited can thereby be advantageously reduced or avoided, due to the electrostatic adhesion forces.

The fiber support may moreover include a heating device which heats the deposited 1 or 2-dimensional fiber structures to a predetermined temperature.

Due to heating to a predetermined temperature a binding agent which is applied onto or into the 1 or 2-dimensional fiber structures can for example be advantageously activated resulting in that the 1 or 2-dimensional fiber structures adhere to each other or bond together, thus making possible at least a partial consolidation of the 1 or 2-dimensional fiber structures. It is for example also conceivable that the 1 or 2-dimensional fiber structures are heated in such a way that subsequent heating, for example during a consolidation process can occur faster so that the process speed can be increased. The predetermined temperature can hereby be a melting or fusing temperature of the binding agent or a temperature which is established at a maximum of 10%, in particular a maximum of 20%, possibly a maximum of 30%, or for example a maximum of 40% below the consolidation temperature.

The fiber support may moreover include a first conveyor by means of which the 1 or 2-dimensional fiber structures are transported further in direction of belt travel, after having been deposited.

In such a design variation continuous fiber reinforced plastic or continuous FRP semi-finished products can be advantageously produced due to the first conveyor. The depositing device can herewith deposit the 1 or 2-dimensional fiber structures in an accordingly desired fiber direction on the first conveyor, whereby the first conveyor continuously transports the deposited 1 or 2-dimensional fiber structures from the depositing location to other regions in the production machine where the 1 or 2-dimensional fiber structures can, for example be consolidated.

The direction of travel of at least one first conveyor can be oriented at a predetermined angle $\beta$ to the direction of travel of at least an additional first conveyor.

If several first conveyors occupy different predetermined angles $\beta$ relative to each other, a multi-layer fiber reinforced plastic or respectively FRP semi-finished product featuring different fiber directions in the fiber layers can be produced in a continuous process. Such a method is possibly advantageous for a production method for organic sheeting.

Several first conveyors could also be used which—analogically to the production of multi-layer papers—produce multiple layers of a FRP semi-finished product by means of the previously described technology, wherein these individual layers are consolidated or partially consolidated in a production machine to a multi-layer fiber reinforced plastic or FRP semi-finished product by means of for example compaction or couching.

The depositing device can moreover include a first, in particular funnel-shaped wide slot die by means of which the 1 or 2-dimensional fiber structures are applied onto the fiber support.

By means of this very simply designed component, easy application of the 1 or 2-dimensional fiber structures onto the fiber support can be accomplished. Moreover, due to the orientation of the slot in the wide slot die, simple adjustment of the fiber direction can be performed. The wide slot die accepts fibers or roving segments for example via a funnel-shaped feed and orients them parallel to the longitudinal axis of the opening of the wide slot die. The opening is preferably between 1 and 20 mm wide transverse to the fiber direction. In the fiber direction, it is a little longer than the fiber length. The fiber length is preferably between 10 and 2000 mm, especially preferably 20 to 300 mm. This data is also preferred for the other depositing devices.

Furthermore, a second in particular funnel-shaped wide slot die may be provided by means of which the 1 or 2-dimensional fiber structures are applied onto a component of the depositing device.

An application of the 1 or 2-dimensional fiber structures onto a component of the depositing device can for example be performed by the second funnel-shaped wide slot die but not in the exact location, whereas a more exact positioning of the 1 or 2-dimensional fiber structures on the fiber support is performed by the appropriate component of the depositing device. Based on this two-stage process greater accuracy can be achieved in depositing the 1 or 2-dimensional fiber structures, so that the desired characteristics profiles can be produced to be more precise and easier reproducible.

The depositing device can moreover include a positioning device by means of which the depositing device can be positioned in relation to the fiber support in such a way that different angles $\alpha$ can be set.

Based on this kind of adjustability of the depositing device, different fiber directions can advantageously be achieved with one and the same depositing device. During a process step angle α can hereby be held constant so that different, but however constant angles α are set in different process steps. It is however also conceivable that during a process step angle α is varied so that within one process step, for example in the formation of a fiber layer, the fiber direction of the individual 1 or 2-dimensional fiber structures is varied as desired and according to preset parameters. Greater flexibility and variability of the adjustable fiber direction can thereby be advantageously accomplished within only one production machine and even within only one process step.

The depositing device can moreover include a propulsion device to move the depositing device forward in the direction of placement during depositing.

The fiber support can therefore for example be advantageously designed to be stationary and the depositing device, due to its propulsion device can move forward relative to a stationary or movable fiber support in the placement direction of the 1 or 2-dimensional fiber structures. The production machine can therefore be designed constructively simpler and wear and tear can be reduced due to the reduced number of moving parts.

It is moreover possible that the depositing device includes a magazine in which the 1 or 2-dimensional fiber structures are stored and can be stripped onto the fiber support and/or onto a component of the depositing device.

Such stripping can for example be understood like pulling a playing card from a card magazine. Accordingly the magazine can be oriented with its opening facing toward the corresponding component of the production machine and because of movements relative to each other the 1 or 2-dimensional fiber structures which are stacked in the magazine, can be stripped onto the respective component. Through such a simple arrangement, storage of the 1 or 2-dimensional fiber structures can be achieved in a simple manner in the production machine which, at the same time can be implemented easily. It is moreover possible that the 1 or 2-dimensional fiber structures can be deposited onto the fiber support simply due to the relative movement of the magazine in relation to the respective component.

The depositing device may moreover include a suction device by means of which a suction force is generated in the depositing device which holds the deposited 1 or 2-dimensional fiber structures on the depositing device. The 1 or 2-dimensional fiber structures can thereby be advantageously aligned precisely on the depositing device and held there and transferred with accordingly analogical accuracy onto the fiber support. This provides high process reliability and exact positioning of the 1 or 2-dimensional fiber structure.

The depositing device may furthermore include an electric polarization device by means of which an electrostatic adhesion force is generated which holds the deposited 1 or 2-dimensional fiber structures on the depositing device. Due to such an electric polarization device previously described advantages for the suction device can be realized. The 1 or 2-dimensional fiber structures can hereby be placed in opposite direction to the placement direction.

The depositing device may moreover include a heating device by means of which the surface of the 1 or 2-dimensional fiber structure which is to be deposited and which is oriented toward the fiber support is heated to a predetermined temperature. Because of such heating of the 1 or 2-dimensional fiber structures, functional components of the 1 or 2-dimensional fiber structure can advantageously be activated on the surface so that for example the surface exhibits a certain adhesion or adhesive effect, thus adhering accordingly better to the deposited or positioned section.

The depositing device may furthermore include at least one second conveyor belt by means of which the 1 or 2-dimensional fiber structures are transported in the direction of belt travel for depositing onto the fiber support. Through use of at least one such second conveyor belt, depositing of the 1 or 2-dimensional fiber structures may be arranged to be continuous, so that the 1 or 2-dimensional fiber structures can be deposited in a continuous process by the depositing device onto the fiber support.

In order to hold the 1 or 2-dimensional fiber structures on the second conveyor belt it may be supplied from the inside with suction. The depositing device may also comprise two second conveyor belts running in opposite directions to each other, whereby the 1 or 2-dimensional fiber structures are held between the two conveyor belts before they are deposited onto the fiber support.

The direction of travel of the at least one second conveyor belt can be oriented at a predetermined angle γ to the direction of travel of at least one additional second conveyor belt. If therefore at least two second conveyor belts are used, the depositing device can advantageously produce fiber layers having different predetermined angles γ and consequently having different angles α in one production step.

However, the direction of belt travel of at least one second conveyor belt may also be oriented at a predetermined angle δ relative to the direction of belt travel of at least one first conveyor belt. In the case where the placement direction, as well as the depositing device include at least one conveyor belt, a continuous production process for FRP semi-finished products or fiber reinforced plastic can be established, whereby at least one fiber layer exhibits one fiber direction at a desired angle α. If several second conveyor belts are used, multi-layer fiber reinforced plastic or FRP semi-finished products can be produced which are composed of fiber layers having different angles α.

Moreover, an adjustment of the respective adhesion forces can be performed in random sequence, additionally or alternatively in such a way that the respective adhesion force is smaller at the depositing device than the respective adhesion force at the fiber support. Adhesion forces are understood to be for example the suction force, an electrostatic adhesion force, an adhesion force or suchlike. With such an arrangement of the adhesion forces a simple transfer of the 1 or 2-dimensional fiber structures onto the fiber support can be achieved, without an elaborate adjustment becoming necessary.

Moreover a lowering of the respective adhesion force can be performed in random sequence additionally or alternatively at the depositing device at the time of deposit and/or in the deposit region. Easy stripping of the 1 or 2-dimensional fiber structure during depositing can be achieved at the depositing device through such a lowering, whereby lowering of the adhesion force to 0 is also conceivable.

Moreover increasing the respective adhesion force to the fiber support at the time of deposit and/or in the deposit region is also conceivable. Because of an increase a greater reliability is advantageously provided during transfer of the 1 or 2-dimensional fiber structure via the fiber support from the depositing device. It is therefore conceivable that advantageously for example even actual suction application on the 1 or 2-dimensional fiber structures through the fiber support at the time of depositing and/or in the depositing region can occur.

The 1 or 2-dimensional fiber structures can moreover be fixed relative to each other by means of a fixing device after and/or during depositing of the 1 or 2-dimensional fiber structures onto the fiber support. Slipping of the 1 or 2-dimensional fiber structures occurring after depositing can be advantageously reduced or prevented by such a fixing device.

The 1 or 2-dimensional fiber structures can moreover be fixed on the fiber support by means of a fixing device after and/or during depositing of the 1 or 2-dimensional fiber structures onto the fiber support. Slipping of the 1 or 2-dimensional fiber structures on the fiber support is advantageously reduced or prevented due to the fixing device.

The fixing device can furthermore include a second compression mold half with a surface profile which is complimentary to the first compression mold half. In a consolidation process the surface profiles of the two compression mold halves can thereby in interaction with each other at least partially profile or partially consolidate the fiber reinforced plastic which is producible with the method, or the FRP semi-finished product which is producible with the method. The FRP semi-finished product or respectively the fiber reinforced plastic consisting of 1 or 2-dimensional fiber structures can advantageously be deposited and at least partially profiled within a production machine due to such an integral arrangement with the production machine of a compression mold comprising two compression mold halves so that a production close to final contours becomes possible by means of the method or respectively the production machine.

The fixing device may moreover include a compression device with which the 1 or 2-dimensional fiber structures which were deposited on the fiber support are held relative to each other and/or on the fiber support by means of compression. Also, due to this integrated design, compaction of the deposited 1 or 2-dimensional fiber structures within one method or respectively within one production machine is possible. This allows for the production speed to be increased and transport paths can furthermore be reduced.

The compression device can moreover include at least one roller whereby fixing of the 1 or 2-dimensional fiber structures which were deposited on the fiber support relative to each other is performed by the roller by means of pressure between the at least one roller and the fiber support. Advantageously a continuous process can be provided by such a roller, whereby the 1 or 2-dimensional fiber structures are deposited onto a first conveyor belt and after further transportation to the roller can be compacted by the roller. This makes increased process integration possible and larger volumes of fiber reinforced plastic or FRP semi-finished products can also be produced within a shorter time frame.

The at least one roller can hereby also be arranged following the depositing device in the direction of placement. Through such an arrangement of the roller, for example as an unwind which can moreover be heated, compaction of the 1 or 2-dimensional fiber structures close to the desired final contours by means of a roller is possible, even with curved surfaces. The roller can in particular have a flexible surface, for example a foam surface. It can therefore adapt to a certain extent to the opposite contour.

The compression device may moreover include at least two rollers, whereby fixing of the 1 or 2-dimensional fiber structures which were deposited on the fiber support relative to each other can be performed by pressing between the two rollers. Advantageous with the two-roller design variation is also the possibility of a continuous process, as known for example from paper machines. The 1 or 2-dimensional fiber structures, placed on perforated fabrics or slotted screens can thereby be pressed by at least two rollers, whereby the rollers may in addition also be heated.

The fixing device can moreover also include a heating device which bonds the deposited 1 or 2-dimensional fiber structures together through heating to a predetermined temperature. As already described previously, such a heating device can heat at least one roller and can produce the heat input into the deposited 1 or 2-dimensional fiber structures through heat radiation, hot air or electric heat. Substances contained in the 1 or 2-dimensional fiber structures can thereby be activated through heating, so that the 1 or 2-dimensional fiber structures are held together for example through an adhesion effect, polymerization or fusing of plastics. The heating device is operated or respectively designed so that a temperature of between 60 and 200° C., preferably between 80 and 140° C. is achieved in the fiber structure. This enables optimum setting of a binding agent.

Moreover it is also conceivable that the fixing device includes a radiation device which bonds the deposited 1 or 2-dimensional fiber structures together by means of radiation. The radiation may hereby be infrared radiation, UV-radiation, maser radiation, induction field, oriented and positioned punctiform or flat. Due to the use of a radiation device the fixing device can be located advantageously at a further distance from the fiber support, so that longer distances are also surmountable due to the possibly focused radiation, so that the free space can advantageously be occupied, at least from time to time by other components. In addition the heat input by means of a focused radiation device provides pinpoint accuracy so that only certain points in the deposited 1 or 2-dimensional fiber structures are fixed so that based on the only partial bonding, subsequent reshaping, for example of the FRP semi-finished product remains possible.

The fixing device can moreover include a spraying device which bonds the 1 or 2-dimensional fiber structures together through spraying with a binding agent or matrix material. Because of a spraying device the binding agent can advantageously be applied after depositing the 1 or 2-dimensional fiber structure, so that bonding or adhesion of the fiber structures during depositing or before can be largely avoided. It is moreover possible that a large enough amount of binding agent or matrix material is applied by the spraying device that an additional application of matrix material during the consolidation process is no longer necessary.

A different type of binding agent application device may also be used instead of the spraying device. The fixing device can in particular comprise a binding agent application device as well as a heating device or a radiation device, so that the binder is applied and sets on the fibers.

When depositing with a wide slot die, a clear gap exists between depositing device and fiber support over which the 1 or 2-dimensional fiber structure is deposited. Also, when depositing with a second conveyor belt or a roller, a clear gap to the fiber support can exist. There does not have to be contact between the depositing device and the fiber support in the placement region. In the placement region of the depositing device a vacuum that is present in the supply region can be interrupted or even be changed in the placement region to blow out in order to transfer the fiber structure to the fiber support. The height of the free gap can preferably be between 1 mm and 50 mm.

In particular if depositing occurs with a clear gap as described above it can be advantageous to provide a subsequent roller as a fixing device which presses the deposited fiber structures onto the fiber support and which can be optionally heated. A roller used as the fixing device and/or the depositing device has a diameter of preferably between 10 and 100 mm.

In order to not deposit the ends of the 1 or 2-dimensional fiber structure in one alignment so that a less abrupt transition is created in the edge region, the depositing device can be laterally moved relative to the fiber support. As a result the 1 or 2-dimensional fiber structures are deposited alternately laterally offset to one another. The displacement can be realized through a lateral movement of the depositing device or the fiber support. Alternatively the 1 or 2-dimensional fiber structures can be fed to the depositing device in such a way that they are accepted by said depositing device, alternately laterally moved and are transferred to the fiber support.

It is moreover advantageous for the production of larger areas or a more strongly defined 3-D topography of the fiber support if several strips of 1 or 2-dimensional fiber structures are deposited next to one another. The strips may exhibit different angles of the respective fiber orientation relative to the placement direction, however always within the specified angle range. The inventive method is hereby utilized several times in succession for the individual strips.

It is advantageous in all arrangements according to the invention if the conveying direction of the feed of the 1 or 2-dimensional fiber structures, relative to the depositing device, is aligned substantially perpendicular to the fiber direction of the 1 or 2-dimensional fiber structures.

In one additional aspect of the invention a production machine for the production of a 2 or 3-dimensional fiber structure, in particular a fiber reinforced plastic or FRP semi-finished product is suggested according to a previously described method, comprising a depositing device and a fiber support. The previously described advantages can advantageously be achieved with a production machine of this type.

The advantageous characteristics already described for the method can also be applied to the production machine according to the invention.

Additional important characteristics and advantages of the invention result from the sub-claims, the drawings or the associated descriptions of the drawings. Preferred design examples of the invention are illustrated in the drawings and are explained in further detail in the following description, whereby same reference identifications apply to same or similar or functionally same components.

BRIEF DESCRIPTION OF THE DRAWINGS

The above-mentioned and other features and advantages of this invention, and the manner of attaining them, will become more apparent and the invention will be better understood by reference to the following description of the embodiments of the invention taken in conjunction with the accompanying drawings, wherein.

DETAILED DESCRIPTION OF THE INVENTION

Figure 1:
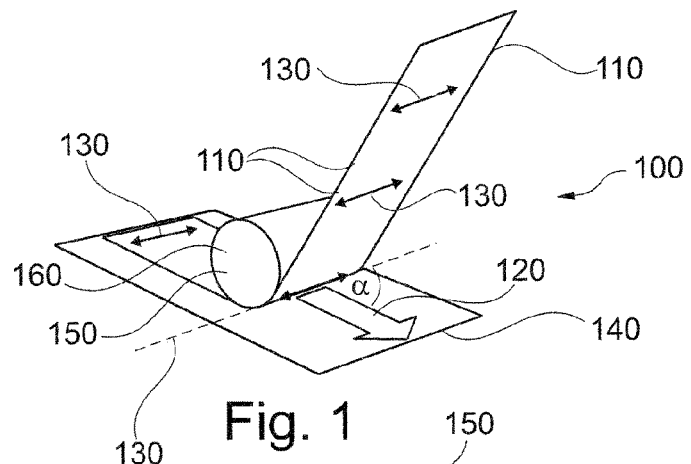
FIG. 1 is a perspective view illustrating the depositing of 1 or 2-dimensional fiber structures with a fiber direction that is different than a placement direction.

A method 100 as illustrated in FIG. 1 wherein 1 or 2-dimensional fiber structures 110 are deposited transversely relative to a depositing device 150 is characterized in that one fiber direction 130 of the deposited 1 or 2-dimensional fiber structures 110 is arranged at an angle $\alpha > 20°$ relative to placement direction 120. The 1 or 2-dimensional fiber structures 110 are moreover not tensioned along placement direction 120 and also not in fiber direction 130. The lack of tension in placement direction 120 can for example be implemented in that the individual 1 or 2-dimensional fiber structures which are connected into a strand hang down in the direction of a fiber support 140 and are fed to fiber support 140 in this hanging condition and therefore without additional tension. They can however also be deposited as individual 1 or 2-dimensional fiber structures (for example as fibers or roving segments or tape segments) with a suitable depositing device 150 and an appropriate feed device, for example a roller and a suction-equipped conveyor belt, or suchlike. Due to the fact that the 1 or 2-dimensional fiber structures are not unwound as continuous fiber structures from the roller and deposited under tension as is the case in the current state of the art with multi-axial laid structures, but are deposited in fiber direction as tension-free segments, curved surfaces can also be very well covered. 1 or 2-dimensional fiber structures 110 are therefore not deposited in a tensioned state onto a fiber support 140, but they can be deposited free of tension at any desired angle $\alpha$ between 20° and 90° by a depositing device 150 onto fiber support 140. In order to set different angles, depositing device 150 may for example be located transversely relative to fiber support 140. It is however also conceivable that depositing device 150 during depositing is turned or moved time after time. A fixing device 160 may be provided which can be in the embodiment of a roller 160.

Figure 2:
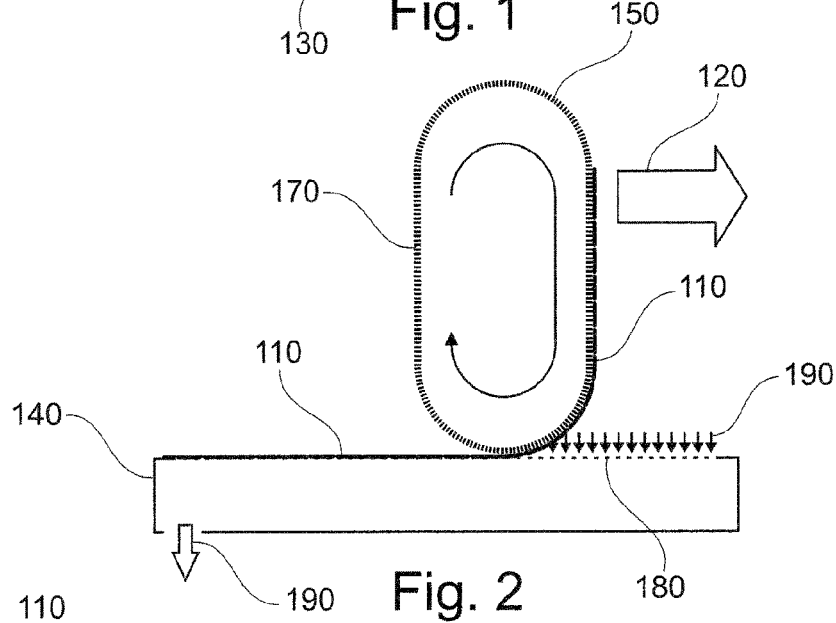
FIG. 2 illustrates the depositing of 1 or 2-dimensional fiber structures by a moving depositing device and a stationary fiber support.

As show in FIG. 2, depositing device 150 can be moved in the direction of placement 120. Consequently a propulsion device (not shown) can be used for moving depositing device 150. Fiber support 140 can moreover be stationary, for example in the embodiment of a perforated screen suction table or suchlike. It is however also conceivable that fiber support 140 is in the embodiment of a first conveyor belt with a slotted screen. Depositing device 150 may moreover be in the embodiment of a second conveyor belt 170, whereby conveyor belt 170 unwinds with its surface on fiber support 140, at the same time depositing 1 or 2-dimensional fiber structures 110 on fiber support 140. Fiber support 140 can moreover exhibit a perforated structure 180 onto which 1 or 2-dimensional fiber structures 110 are held by means of suction force 190. It is however also conceivable that conveyor belt 170 is equipped with suction, so that 1 or 2-dimensional fiber structures 110 are held on conveyor belt 170 during transport by means of suction force 190. It is also conceivable that an additional second conveyor belt (not illustrated) is provided, so that the 1 or 2-dimensional fiber structures are held between the two second conveyor belts 170 before they are deposited onto fiber support 140.

Figures 3A, 3B, 3C, 3D:
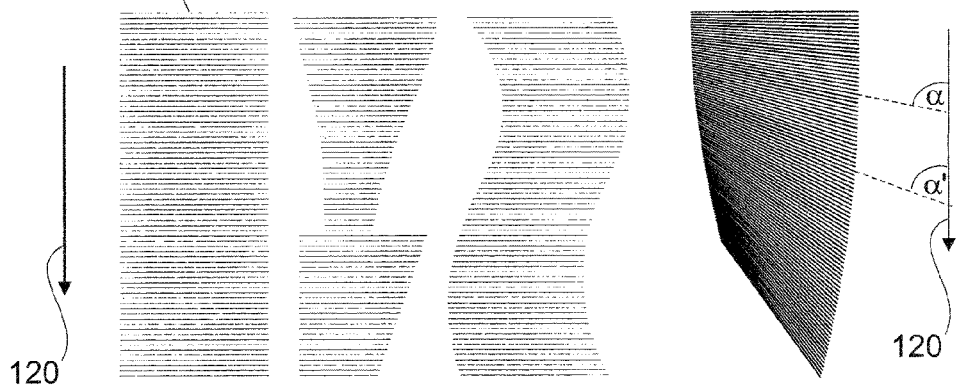
FIGS. 3A-3D illustrate possible fiber positioning and orientations in accordance with the present invention.

With this type of in particular tension free transverse depositing of 1 or 2-dimensional fiber structures 110, the depositing possibilities shown in FIGS. 3A to 3D for 1 or 2-dimensional fiber structures 110 can be produced inter alia. It is thereby conceivable that equally long 1 or 2-dimensional fiber structures 110 are deposited parallel to each other and for example at a predetermined angle α relative to placement direction 120, as shown in FIG. 3A. In FIG. 3B 1 or 2-dimensional Fiber structures 110 having different fiber lengths are deposited, whereby angle α is not changed. In FIG. 3C 1 or 2-dimensional fiber structures 110 having equal fiber length and/or the same angle are deposited, however at different positioning. The arrangement of 1 or 2-dimensional fiber structures 110 according to FIG. 3D exhibits an angle α,α' which is changeable relative to placement direction 120 at least in progression of placement direction 120. Any other desired combinations or depositing options are also conceivable.

Figure 4:
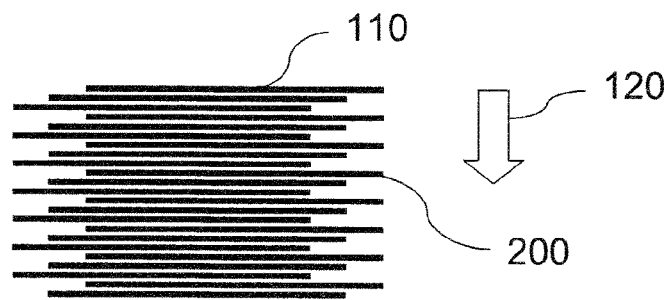
FIG. 4 is a side view of laterally alternating deposited 1 or 2-dimensional fiber structures.

FIG. 4 shows a laterally alternating deposit of 1 or 2-dimensional fiber structures 110. The individual fibers or roving segments 200 are in this case for example deposited offset in three steps. However, other offset-variations are also conceivable. This creates less abrupt transition to the adjacent regions.

Figure 5:
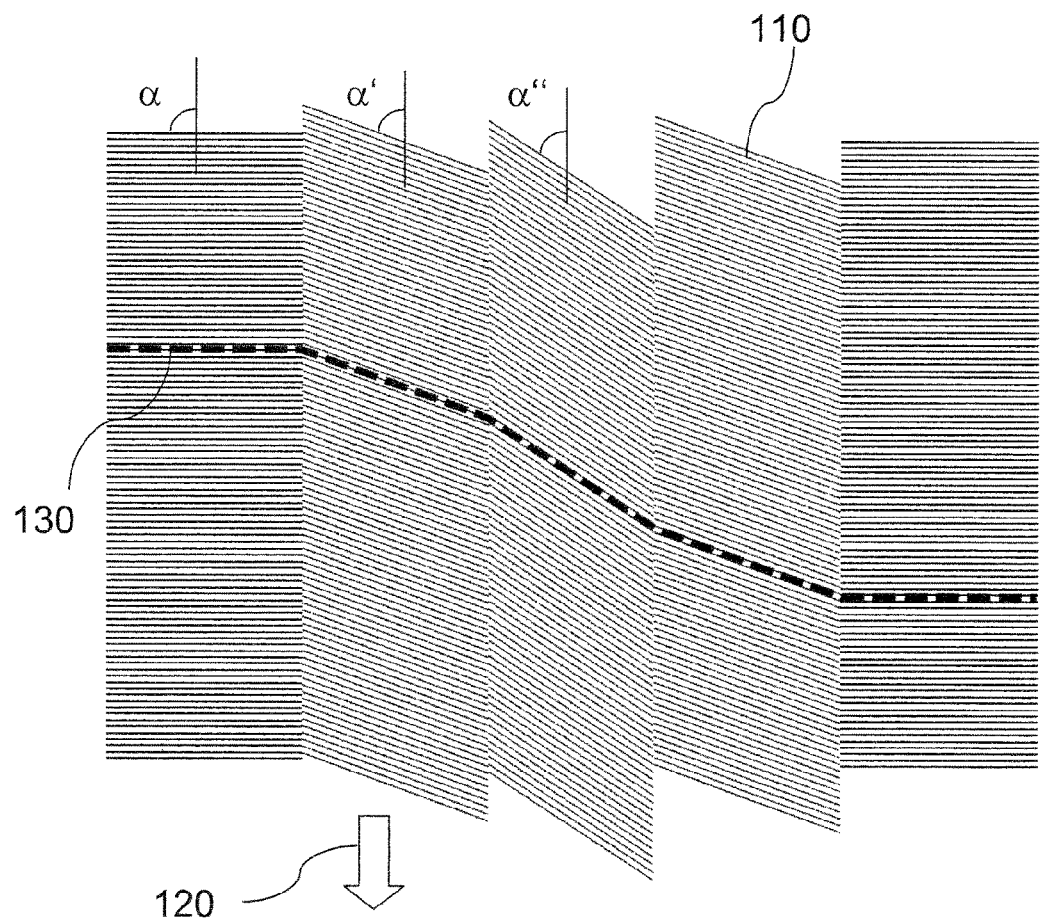
FIG. 5 illustrates fiber structures of several laterally adjacent deposited 1 or 2-dimensional fiber structures.

FIG. 5 shows an example of how several strips of 1 or 2-dimensional fiber structures 110 can be deposited adjacent to one another so that a larger surface comprising different fiber directions 130 can be deposited. Initially a first strip is deposited with the method, in this case at an angle α=90° relative to placement direction 120, then a second strip at an angle α' and an additional one at an angle α", and so on. More strongly defined topographies or special requirements in regard to fiber directions can thereby be more easily considered.

Figure 6:
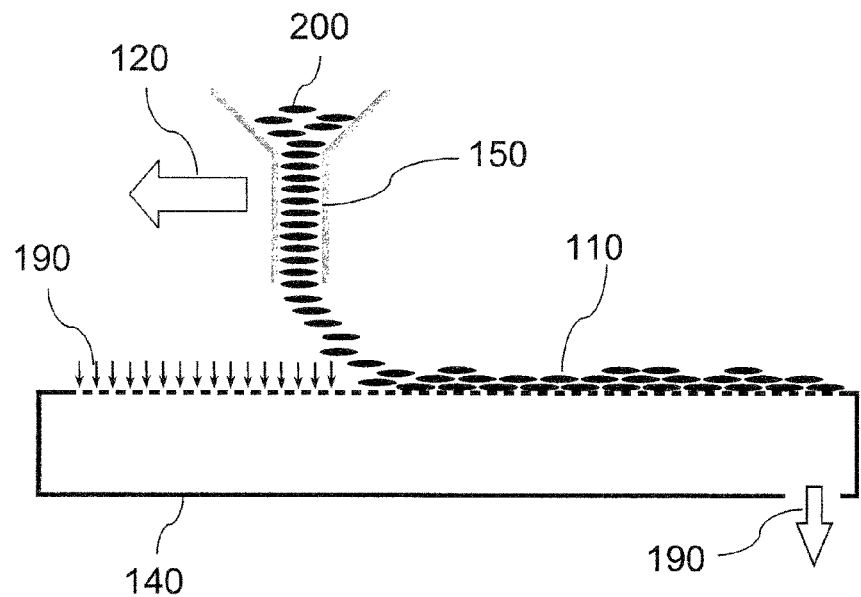
FIG. 6 illustrates a production machine with a wide slot die featured as the depositing device.

An example for a production machine according to the invention is illustrated in FIG. 6, comprising a wide slot die as the depositing device 150. Fibers or roving segments 200 are supplied via a funnel, aligned, and deposited over a free gap onto fiber support 140 which in this case is in the embodiment of a suction equipped compression mold. Suction forces 190 ensure fixing on the fiber support. Fibers or rovings 200 can in addition also be pretreated with binding agent and can be bonded on the fiber support with a fixing device, for example in the embodiment of a heating device.

Figure 7:
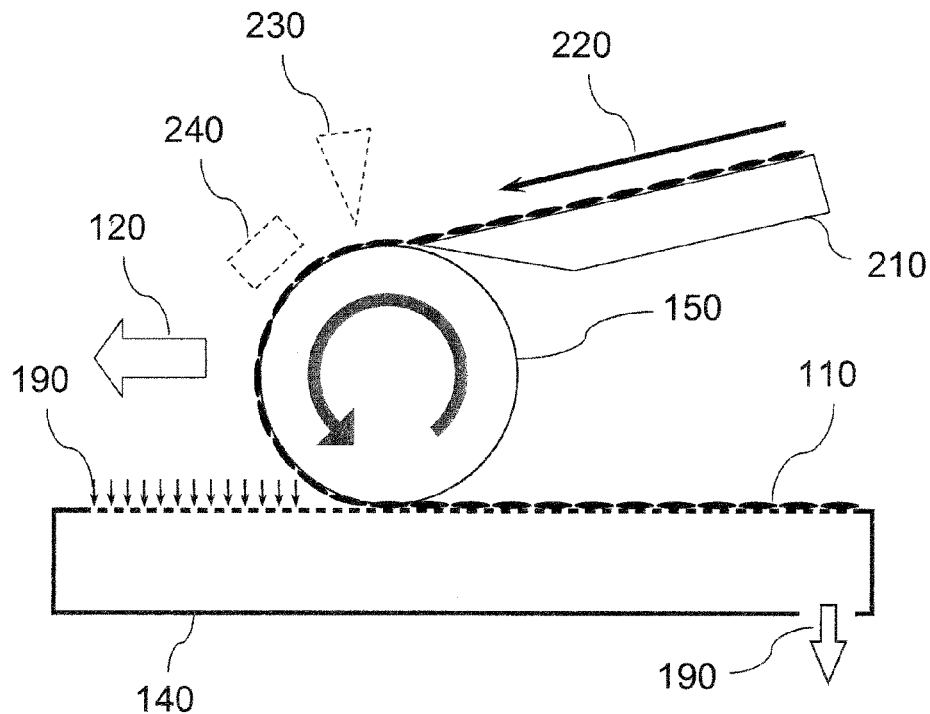
FIG. 7 illustrates a production machine with a roller featured as the depositing device.

FIG. 7 shows an additional variation of a production machine according to the invention with a depositing device 150 which includes a roller. Fibers or roving segments are fed via a feeding device 210 in conveying direction 220. A depositing device 150 which in this case is in the embodiment of a roller which can possibly be suction equipped deposits the 1 or 2-dimensional fiber structures onto fiber support 140 which again is illustrated as being suction equipped. Alternatively or in addition to suction, a binder application device 230 can be provided which applies binder to the fibers. A heating or radiation device 240 can ensure that the fibers adhere to one another and/or to fiber support 140.

Figure 8:
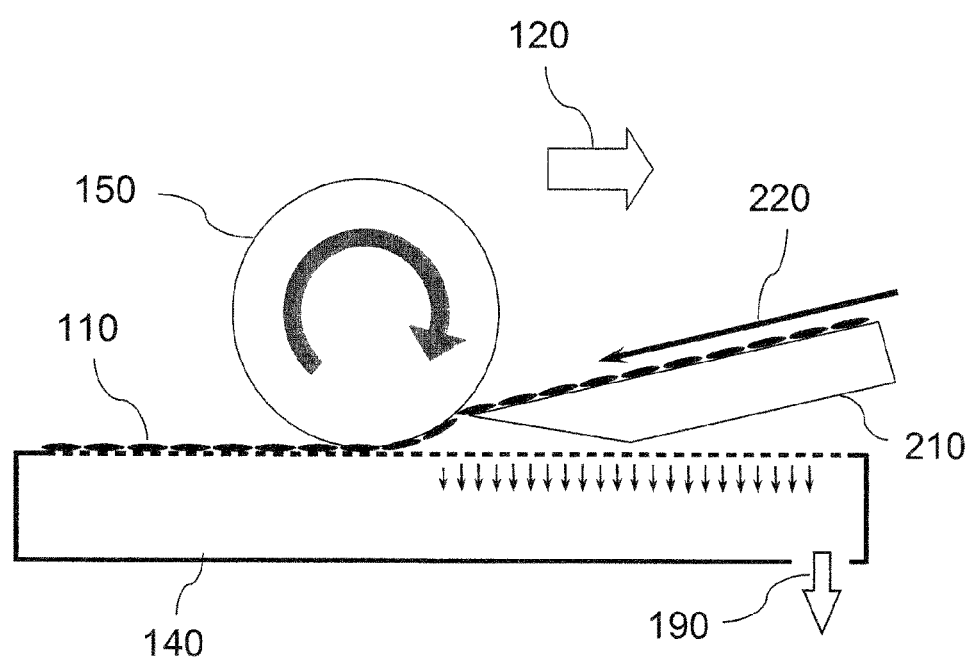
FIG. 8 illustrates an additional production machine with a roller as the depositing device.

The production machine in FIG. 8 shows another variation of feeding device 210 for the raw material. In this case the conveying direction 220 is opposite to that of the direction of the depositing device 120.

The fiber direction is illustrated for all these design examples at α=90° relative to the depositing direction. According to the invention it can however also be within the specified range of between 20° and 90° or can, as previously described, be changed during depositing. All characteristics which are described or illustrated for one of the arrangements can moreover also be utilized according to the invention in conjunction with the respective other illustrated arrangements.

Even though only flat fiber supports are illustrated in these design examples due to clarity, the inventive method and the production machine can be used especially advantageously for depositing onto 3-dimensional fiber supports. In all variations the depositing device can be moved either in the placement direction over the fiber support, or the fiber support can be moved under the depositing device in opposite direction to the placement direction.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for depositing 2 dimensional fiber structures in order to form a 3 dimensional fiber structure, in the form of a fiber reinforced plastic (FRP) or a FRP semi-finished product, the method comprising the steps of:
    providing at least one depositing device and at least one fiber support, wherein said 2 dimensional fiber structures include at least one unidirectional fiber layer;
    placing said 2 dimensional fiber structures by said depositing device onto said fiber support in a direction of placement in such a way that fiber directions of the deposited 2 dimensional fiber structures assumes an angle α>20° relative to the direction of placement; and
    depositing said 2 dimensional fiber structures substantially free of a tension in the fiber direction onto the fiber support, such that said 2 dimensional fiber structures are held on the at least one depositing device by a suction force in the at least one depositing device and the suction force is less in a deposit region, wherein said 2 dimensional fiber structures are deposited alternately offset laterally, positioned transversely to the direction of placement, to each other on the fiber support, so that a respective end of the 2 dimensional fiber structures does not come to rest in a straight line.

2. The method according to claim 1, wherein said angle α has a range from 21° to a maximum of 90°.

3. The method according to claim 1, wherein said 2 dimensional fiber structures exhibit at least one characteristic of:
    consisting of at least one unidirectional fiber layer; and
    being arranged as at least one multi-axial laid structure.

4. The method according to claim 1, wherein said fiber support includes at least one of:
    a first compression mold half with a surface profile which is configured for structuring said 3 dimensional fiber structure in a consolidation process;
    a suction device which generates a suction force in the fiber support that can hold said 2 dimensional fiber structures on the fiber support; and
    a first conveyor which can transport said 2 dimensional fiber structures further in a direction of belt travel, after having been deposited, wherein said 2 dimensional fiber structures can be deposited by the depositing device by at least one of depositing directly onto said first conveyor and depositing wherein a direction of travel of said first conveyor can be oriented at a predetermined angle β to a direction of travel of at least one additional conveyor.

5. The method according to claim 4, wherein said depositing device includes at least one of:
- a positioning device that can variably set said angles α by positioning the depositing device relative to the fiber support;
- a propulsion device that can move the depositing device forward in the direction of placement while depositing said 2 dimensional fiber structures;
- a suction device which can generate a suction force in the depositing device to hold the 2 dimensional fiber structures on the depositing device; and
- at least one second conveyor belt which can transport said 2 dimensional fiber structures in a direction of belt travel for depositing onto the fiber support, wherein a direction of belt travel of at least one second conveyor belt is oriented by at least one of a predetermined angle δ relative to a direction of belt travel of at least one additional second conveyor belt and wherein the direction of travel of at least one second conveyor belt is oriented at a predetermined angle γ to the direction of travel of at least one first conveyor belt.

6. The method according to claim 5, wherein said method further includes at least one:
- adjusting an adhesion force holding said 2 dimensional fiber structures on the depositing device such that a respective adhesion force at the depositing device is smaller than a respective adhesion force at the fiber support;
- lowering an adhesion force on the depositing device during at least one of a time of deposit and in a deposit region; and
- increasing an adhesion force on the fiber support during at least one of a time of deposit and in a deposit region.

7. The method according to claim 1, wherein said 2 dimensional fiber structures are held relative to each other by a fixing device throughout at least one of after and during depositing the 2 dimensional fiber structures onto the fiber support.

8. The method according to claim 7, wherein said 2 dimensional fiber structures are held on the fiber support by said fixing device throughout at least one of after and during depositing the 2 dimensional fiber structures onto the fiber support.

9. The method according to claim 8, wherein the fixing device includes at least one of:
- a second compression mold half with a surface profile which is complimentary to a first compression mold half and which is configured for profiling said 3 dimensional fiber structure in a consolidation process; and
- a spraying device which bonds said 2 dimensional fiber structures together through spraying with at least one of a binding agent and a matrix material.

10. The method according to claim 9, wherein the fixing device includes a compression device having at least one roller, wherein the roller has a diameter of between 10 and 100 mm.

11. The method according to claim 1, wherein said method further includes a step of depositing a plurality of strips of said 2 dimensional fiber structures on the fiber support one after another and adjacent to one another.

* * * * *